Figure 1:
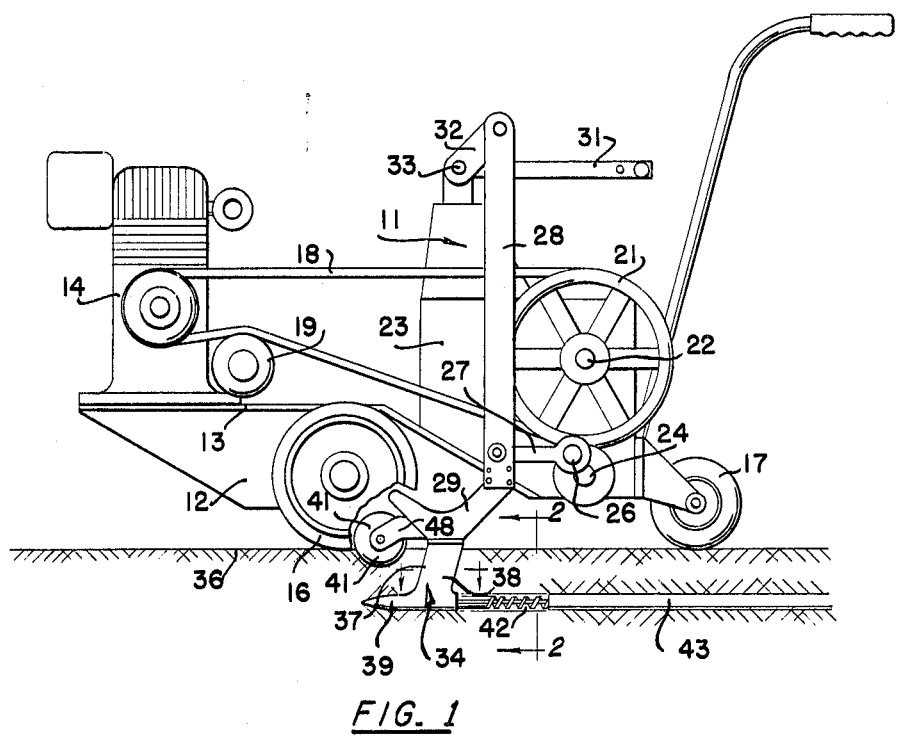

Aug. 24, 1965  P. N. CHRISTENSEN  3,201,944
PIPE AND CABLE LAYING MACHINE
Filed July 12, 1962                                2 Sheets-Sheet 1

INVENTOR.
PETER N. CHRISTENSEN
BY
ATTORNEY

Aug. 24, 1965 P. N. CHRISTENSEN 3,201,944
PIPE AND CABLE LAYING MACHINE
Filed July 12, 1962 2 Sheets-Sheet 2

INVENTOR.
PETER N. CHRISTENSEN
BY
ATTORNEY

United States Patent Office 3,201,944
Patented Aug. 24, 1965

3,201,944
PIPE AND CABLE LAYING MACHINE
Peter N. Christensen, 1135 W. Custer Place, Denver, Colo.
Filed July 12, 1962, Ser. No. 209,431
3 Claims. (Cl. 61—72.5)

The present invention relates to a pipe and cable laying machine and, more particularly, to a machine that is particularly adapted by reason of its size, operation and portability for use when placing underground sprinkling systems or when laying service entrance cable and the like.

Previously, others have made and used various types of cable laying devices or plows so that long lengths of cable and flexible pipe could be emplaced beneath the surface of the ground. Usually the prior types of machines have used some type of plow or cutter bar which was moved through the soil at a regular rate by a large tractor or other similar device. In most prior apparatus the cable or pipe was systematically dispensed from a supply reel mounted and moved with the trench cutting plow and, in general, the cable or pipe was supplied so that it moved down into and was received in the newly cut trench.

Recognizing the possible advantage in being able to use an automatic pipe laying device in connection with the installation of modern day sprinkler systems or service entrance electrical loops, the present inventor has sought to avoid some of the disadvantages of conventional large and expensive equipment through the development of a new type of pipe laying device. In such development the following objectives have been of major importance:

To provide a machine capable of emplacing flexible pipe or service entrance cable of length comparable to the maximum lengths of such materials conventionally used at housing sites.

To provide a machine of relatively small size and of compact design to efficiently bury and emplace pipe and cable at housing sites where access and operational clearances may be limited.

To provide a small, efficient and compact machine which can be operated economically and which is of relatively small cost when compared to conventional types of machinery presently being used for the same job.

To provide a machine which will efficiently bury and install pipe and cable in already established lawns without attendant marring or destroying the lawn surface.

To provide a machine which efficiently propells and draws a trench slitting member through sod and turf and which is further capable of pulling a substantial length of hose, pipe or cable into place behind the slitting member.

To provide a machine which can be used for other household type purposes in addition to the installation of buried pipe and cable.

To provide an attachment for sod cutting type machines whereby such machines may be used to bury and emplace lengths of cable and pipe.

To provide a hose, pipe or cable engaging device whereby the pulsating forces of the machine drive mechanism are in part isolated from the cable or pipe member being emplaced by such machine.

Figure 2:
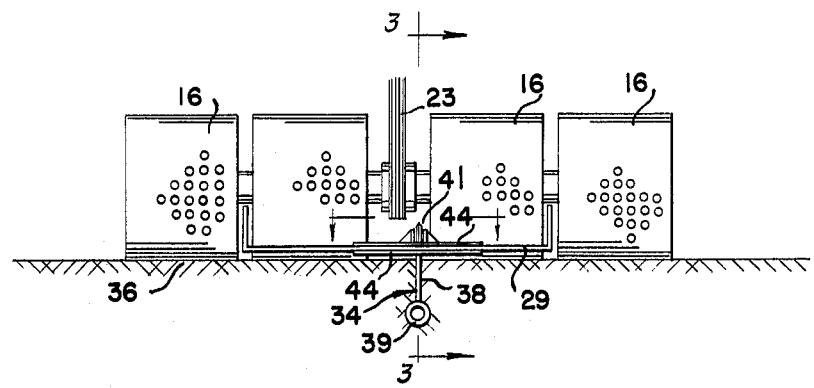
Figure 5:
Figure 3:
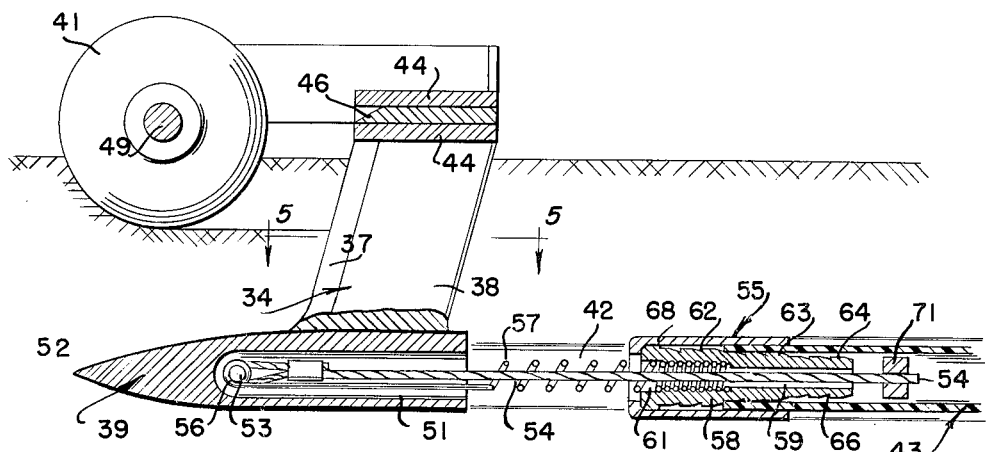
Figure 4:
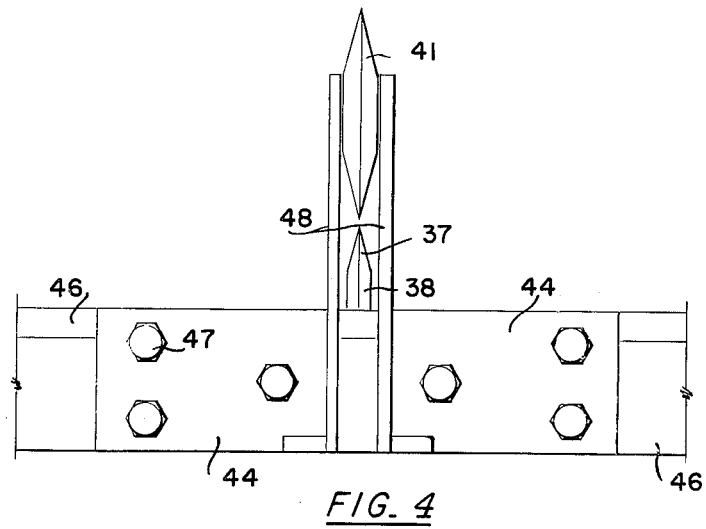

Further objects and advantages of the present invention will be apparent from the appended description and drawings, in which FIG. 1 is a side elevation showing the overall configuration and the drive propulsion elements of a machine made and used in accordance with this invention, FIG. 2 is a rear partial elevation further illustrating such machine, FIG. 3 is a side elevation taken along the line 3—3 of FIG. 2 showing a trench slitting device and emplacing point, FIG. 4 is a top view showing a rotating blade or coulter which may be used ahead of the pipe and cable emplacing member, and FIG. 5 is a cross-sectional view taken along the line 5—5 of FIG. 3 showing the sharpened cutter blade of the emplacing member.

Briefly stated, the present invention provides a hand operated walking type machine which may be used by an individual in close quarters to install and emplace flexible pipe or cable underground in a trench cut and slit by the machine. The machine is so constructed that a unitary plow type emplacing point and cutter member is reciprocated horizontally as it is introduced into the ground and as it is moved forwardly at a regular rate by the machine's driving mechanism. The combination of the constantly applied propulsive force derived from the drive mechanism and the reciprocally applied force of the cutter member make it possible for the machine to plow and cut a trench in turf and sod and further make it possible for the emplacing plow point to open a receiving path for and to pull a substantial length of pipe or cable down into the turf and sod. The pipe or cable is trailed along behind the forwardly moving point until a required length of such pipe or cable has been installed in the opened trench and pathway. The drive mechanism utilizes wheels or rollers of substantial width to provide adequate tractive force for the mechanism. These wide wheels and rollers effectively hold down the sod and turf being slit so that a narrow slit or cut is the only surface indication of the buried pipe emplacement. A follower wheel may be provided to effectively close even such narrow slit after the passage of the cutter member. Means and apparatus are provided for adjusting the depth of penetration of the cutter point.

The invention further contemplates and includes the provision of a cutter point attachment for machines and mechanisms of the foregoing type. Such cutter point attachment includes a loaded spring and a pipe engaging connector between the pipe or cable being installed and the cutter point in order to avoid excessive shock loading of the pipe or cable as it is being pulled through the underground trench.

The features of a specific embodiment of the invention are shown in the accompanying drawings, in FIG. 1 of which the overall arrangement of drive elements is illustrated. The unit illustrated as a cable or pipe laying machine 11 includes a base frame 12 providing a platform 13 which mounts and supports an internal combustion engine 14. The frame and platform 12 and 13 are mounted on wheel supports, inclusive of the front drive wheels 16 and a rear guide wheel 17. The power of the engine 14 is selectively applied through a V-belt drive 18 upon engagement of a clutching member 19 to a main drive pulley 21.

The drive pulley 21 is mounted on shaft 22 which extends through the main crank case 23. Within the crank case 23 rotative forces from the shaft 22 are used for multiple purposes. First, a drive interconnection is established between the shaft 22 and the front drive wheels 16 so that the cable and pipe laying machine will be moved along the ground. Second, a drive connection is established between the shaft 22 and eccentric drive shaft 24. This shaft rotates an eccentric crank arm 26 laterally and outside of the main drive of the crank case 23 to reciprocally move a Pitman arm 27 in a horizontally oriented pattern. The Pitman arm is itself connected to side rocker arms 28 so that the movement of the Pitman is transmitted to such side arms. In the embodiment illustrated this reciprocal movement of the side arms is directly transmitted to a blade mount 29 bolted to the side arms.

In addition to the rocking or pendulum motion of the side arms, the mechanism provides means for raising and lowering the side arms to adjust the relative positioning of the blade mount 29. This adjustable positioning is accomplished by an interconnection between the lever arm 31 and a crank arm 32 which are both attached to the shaft 33.

When in the down position, the blade mount 29 will hold a cutter member 34 in position beneath a surface upon which the front drive wheels 16 and the rear wheel 17 rests. Rotation of the motor will propel the cable and pipe laying machine 11 forwardly along the ground surface 36 while the same rotation causes a horizontally oriented rocking movement of the blade mount 29 and cutter member 34. It will be seen from the other figures in the drawings that this cooperative movement makes it possible for the forward edge 37 of a cutting blade 38 to slice through the turf surface at the same time that an emplacing plow point 39 of the cutter member 34 opens a path 42 for a pipe 43 or cable being trailed behind the cutter member 34.

FIG. 2 further illustrates some of these described features. The relative positioning of the blade mount 29, the cutter member 34 and of the emplacing point 39 is shown. Here it should be noted that a plurality of drive wheels 16 are used so that sufficient tractive force may be exerted against the supporting ground to assure the proper penetration and movement of the cutter member 34 through the ground 36. Multiple drive wheels 16 can be provided in the pattern shown on a walking type mechanism 11 without exceeding some important size limitations that have been observed in connection with the present invention. With the multiple drive wheels the machine is still narrow enough to pass along sidewalks and through yard gates. Accordingly, the machine may be used at established residential sites without inconvenience or special handling.

While the cutter member is shown in off-center position with respect to the main crank case 23 and the drive wheels 16, such configuration is not always required. Here this arrangement is used in order to provide clearance for a closely mounted coulter wheel 31, as more clearly illustrated in FIGURES 1, 3 and 4 in the drawings. Actually a central location for the cutter member 34 is preferred.

In general it may be noted that the presently described structure and operation is comparable to that now being used in connection with sod cutting apparatus. As illustrated and described, the blade mount 29 can actually be the cutting blade of a sod cutting machine. A considerable number of such machines have heretofore been built by various manufacturers and are presently in extensive use. The provision of attachments which will make it possible to use these same machines to place underground cables and pipe is a prime commercial objective of the present invention. Through provision of such an attachment it is known that the utility and value of such machines may be materially enhanced. As sod cutting machines theses mechanisms have a realtively limited seasonal use period. With the pipe emplacing attachments the same machine can be used through a greatly extended period to materially increase the machine owner's profit return.

If the apparatus is to be provided as an attachment for a sod cutting machine, the cutter member 34 can be mounted on the existing machine through the provision of mounting plates 44 that may be attached directly to a sod cutting blade 46. The lower plate 44 is joined to the vertically disposed cutter blade 38 to provide a T shaped structure extending downwardly from the sod cutting blade 46. The lower plate 44 and cutter blade 38 may conveniently be of welded construction. With the blade attached to the lower plate 44, the plate itself may be joined to the sod cutting blade 46 by bolts, cap screws and the like 47. As shown in FIGURES 3 and 4, these same bolts 47 may provide attachment for the mounting of the coulter wheel 41.

A suitable structure is shown in FIGURE 4, where the forked arms 48 extend forwardly from the upper plate 44 and provide turning support about the axle 49 for the coulter wheel 41. As illustrated, the coulter wheel 41 is disposed directly in front of the cutting knife edge 37 of the cutting blade 38. The wheel 41 when mounted in the prescribed manner only slightly penetrates the sod that is to be cut. This preslicing of the turf minimizes any tendency of the turf to be raised away from its at-rest position by the cutting action of the cutting blade 38. Actually the apparatus works satisfactorily without such coulter blade. The forward or knife edge 37 of the cutting blade 38 is disposed at an angle which minimizes the upward thrust exerted against the cut sod by the cutter member 34.

As shown in FIGURE 3, the lower extremity of the cutting blade 38 constitutes a tunnel forming element and is either formed unitarily to a cutting point 39 or is welded to such structure. The relative positioning of the blade and point 38 and 39 is substantially as shown. Preferably the cutter point 39 provides a hollow structure having a central opening 51 disposed behind the sharpened tip 52. The central opening provides protection for an anchor pin 53 to which a pull rod or cable 54 may be selectively attached. The anchor pin 53 further provides an attaching point for the hook end 56 of a tension coil spring 57. Each of these members are so disposed that the pulling force exerted by the machine 11 and through the cutter member 34 may be transmitted selectively to the pipe 43 being placed by the tension spring 57 alone or by the tension spring and cable 54.

Preferably all of the pulling force that is to be exerted against the pipe 43 should be carried by the tension spring 57. The strength of this tension spring likewise should be regulated so that any overload impact force from the reciprocating cutter member 34 will be absorbed in the resulting spring action. Actual use of the device has shown that normally the spring is adequate to transmit all of the necessary pipe pulling force. The cable 54 is provided as an extra precaution to prevent excessive distortion of the spring 57 under overload pulling conditions.

The pulling forces transmitted by the spring 57 and cable 54 are effectively transmitted to the flexible pipe 43 by a coupling which may be of the type illustrated. In FIGURE 3 the coupling 55 includes a body 58 having a central opening 59 through the entire length of which cable 54 extends. A larger bore opening 61 is provided concentric with the opening 59 so that the free end of the spring 57 may be threadedly received therein. With the spring 57 so anchored in the bore 61 of the body 58, spring tension forces will be transmitted to the coupling body 58.

The external surface of the body 58 provides a plurality of stepped shoulders 62, 63 and 64 sized to receive pipe of different diameter. The step shoulders 62, 63 and 64 are also provided with grooves 66 to more securely engage the internal surface of the pipe 43. With the body 58 properly engaged with the pipe 43, a collar 68 is tightened about the exterior surface of the pipe to securely hold the described members in assembled relation. With this assembly the pipe 43 will normally be pulled through the preformed path 42 by the spring action alone. If an obstruction is encountered, the stop 71 on the end of the cable 54 will be pulled into engagement with the connector body 58 and thereafter the excess pulling force will be exerted by the cable 54.

Use of the described machine and attachment has indicated that a 100-foot length of plastic type household sprinkler tubing or pipe may be installed at an underground depth of four or five inches without difficulty. This entire length of tubing can ordinarily be moved through the cut trench by action of the tension spring alone. It is further noted that ordinarily the pulling force necessary to move a full 100-foot length of tubing is well within the permissible tension limitations of such tubing.

In the ordinary use of the apparatus long runs of tubing will be placed, and subsequently minor openings will be dug in a lawn at the points where sprinkler heads are to be installed. These small openings in the lawn surface may be easily repaired after installation of the sprinkler head. Accordingly, this machine makes is possible to install lawn sprinkler systems without noticeable damage to the lawn surface. The trench or slit cut by the cuter member 34 is very narrow. Any slight displacement of soil due to such slit or to the minor raising of the sod as the pipe is placed can be readily erased by running a roller along the lawn upon completion of the installation. The traction drive wheels 16 may be run back over the cut trench with the cutting member raised above ground engagement to effectively close the slit trench. Shorter lengths of pipe and tubing may be installed in similar manner.

A special advantage of the present type of machine is embodied in the fact that the machine itself can be operated in close quarters closely adjacent to sidewalks, fences and other similar obstructions. Through use of such machine sprinkler installations can be made speedily and efficiently without notable deterioration of established lawn surfaces. The same type of machine and attachments may be used to bury electrical cables and other types of conduits, pipe and tubing. Buried power supplies to yard lights and service entrance loops themselves may be readily installed.

While the invention has been described in connection with its use on a walking type motor driven apparatus, it should be apparent that the same combination of drive propulsion and reciprocal forces may be used on larger machines with considerable advantage. Further, it should be noted that while specific embodiments of the invention have been shown and described, the invention may be easily adapted for use in different manners. All such modifications and changes as come within the scope of the present claims are considered to be a part of this invention.

I claim:

1. A machine for carrying and longitudinally moving an elongated member forwardly beneath a ground surface comprising a support means for traversing the ground surface, oscillatable means extending downwardly from said support means and oscillatable relative to said support means for providing impact forces at a predetermined depth beneath the ground surface and in the direction in which said support means traverses said ground surface, a tunnel forming element elongated in the direction of oscillating movement, power means carried on said support means operatively connected to said downwardly extending means for continuously oscillating said downwardly extending means and thereby providing said impact forces, securing means connecting said downwardly extending means to said tunnel forming element at said predetermined depth beneath the ground surface, and conecting means rearwardly extending from said tunnel forming element for joining the elongated member which is to be buried to said tunnel forming element, said connecting means including a flexible element adapted to absorb the rearword oscillating motion of said tunnel forming element so that intermittent impact forces are delivered periodically to the elongated member via said tunnel forming element in only the direction of the forwardly traversing movement of said support means to incrementally and repeatedly pull and advance the elongated member to be buried along a horizontal path in a trailing relation to said tunnel forming element and at the same depth as said tunnel forming element is moved beneath the ground surface.

2. A machine for carrying and longitudinally moving an elongated member forwardly beneath a ground surface comprising a support means for traversing the ground surface, arm means extending downwardly from said support means, said arm means having upper and lower ends with said upper end being pivotally mounted on a transverse axis fixedly related with respect to said support means to thereby render said arm means oscillatable relative to said support means about said transverse axis for providing impact forces at a predetermined depth beneath the ground surface and in the direction in which said support means traverses said ground surface, a tunnel forming element elongated in the direction of oscillating movement, power means carried on said support means operatively connected to said downwardly extending arm means for continuously oscillating said downwardly extending arm means and thereby providing said impact forces, securing means connecting said downwardly extending arm means to said tunnel forming element at said predetermined depth beneath the ground surface, and connecting means rearwardly extending from said tunnel forming element for joining the elongated member which is to be buried to said tunnel forming element, said connecting means including a flexible element adapted to absorb the rearward oscillating motion of said tunnel forming element so that intermittent impact forces are delivered periodically to the elongated member via said tunnel forming element in only the direction of the forwardly traversing movement of said support means to incrementally and repeatedly pull and advance the elongated member to be buried along a horizontal path in a trailing relation to said tunnel forming element and at the same depth as said tunnel forming element is moved beneath the ground surface.

3. A machine for carrying and longitudinally moving an elongated member forwardly beneath a ground surface comprising a support means for traversing the ground surface, arm means extending downwardly from said support means, said arm means having upper and lower ends with said upper end being pivotally mounted on a transverse axis fixedly related with respect to said support means to thereby render said arm means oscillatable relative to said support means about said transverse axis for providing impact forces at a predetermined depth beneath the ground surface and in the direction in which said support means traverses said ground surface, a tunnel forming element elongated in the direction of oscillating movement, power means carried on said support means operatively connected to said downwardly extending arm means for continuously oscillating said downwardly extending arm means and thereby providing said impact forces, a vertical blade element connecting and securing the lower end of said downwardly extending arm means to said tunnel forming element at said predetermined depth beneath the ground surface, and connecting means rearwardly extending from said tunnel forming element for joining the elongated member which is to be buried to said tunnel forming element, said connecting means including a flexible element adapted to absorb the rearward oscillating motion of said tunnel forming element so that intermittent impact forces are delivered periodically to the elongated member via said tunnel forming element is only the direction of the forwardly traversing movement of said support means to incrementally and repeatedly pull and advance the elongated member to be buried along a horizontal path in a trailing relation to said tunnel forming element and at the same depth as said tunnel forming element is moved beneath the ground surface.

References Cited by the Examiner

UNITED STATES PATENTS

| | | | |
|---|---|---|---|
| 338,678 | 3/86 | Sullivant | 61—72.5 |
| 1,817,792 | 8/31 | Yares | 61—72.7 |
| 1,904,666 | 4/33 | Sack | 61—72.7 |
| 2,646,740 | 7/53 | Luoma | 172—19 |
| 2,682,824 | 7/54 | Bowser et al. | 172—118 |
| 2,702,502 | 2/55 | Rogneby | 172—118 |

EARL J. WITMER, *Primary Examiner.*

JACOB L. NACKENOFF, *Examiner.*